(12) United States Patent
Soeda

(10) Patent No.: US 11,168,755 B2
(45) Date of Patent: Nov. 9, 2021

(54) VEHICLE-MOUNTED APPARATUS HAVING BIASING STRUCTURE USING COIL SPRING

(71) Applicant: HITACHI AUTOMOTIVE SYSTEMS, LTD., Hitachinaka (JP)

(72) Inventor: Jun Soeda, Fujisawa (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 392 days.

(21) Appl. No.: 16/345,858

(22) PCT Filed: Oct. 19, 2017

(86) PCT No.: PCT/JP2017/037810
§ 371 (c)(1),
(2) Date: Apr. 29, 2019

(87) PCT Pub. No.: WO2018/083994
PCT Pub. Date: May 11, 2018

(65) Prior Publication Data
US 2020/0182322 A1  Jun. 11, 2020

(30) Foreign Application Priority Data
Nov. 1, 2016  (JP) .............................. JP2016-213973

(51) Int. Cl.
*F16F 1/06* (2006.01)
*F16H 19/04* (2006.01)
(Continued)

(52) U.S. Cl.
CPC ................ *F16F 1/06* (2013.01); *B60G 13/04* (2013.01); *F02M 3/062* (2013.01);
(Continued)

(58) Field of Classification Search
CPC .... F16K 17/048; F16K 17/04; F16K 17/0433; F16K 17/0406; F04C 2/344; F04C 14/22;
(Continued)

(56) References Cited

U.S. PATENT DOCUMENTS 4,396,035 A * 8/1983 Maples ................. F16K 15/044
  137/539
5,911,295 A * 6/1999 Itonaga ..................... F16F 1/06
  192/70.28

(Continued)

FOREIGN PATENT DOCUMENTS

JP  2012-082762 A  4/2012

*Primary Examiner* — Robert A. Siconolfi
*Assistant Examiner* — San M Aung
(74) *Attorney, Agent, or Firm* — Foley & Lardner LLP

(57) ABSTRACT

The present invention is to provide a vehicle-mounted apparatus having a biasing structure using a coil spring capable of reducing a lateral force of a coil spring that is applied to a biasing target member. When N1, n1, N0, and n0 represent the number of effective turns when the relief valve spring 37 is set in a valve hole 34 of a spool 29 in a compressed state, a value of an integer of N1, the number of effective turns when a length of the relief valve spring 37 is a natural length, and a value of an integer of N0, respectively, the spring 37 satisfies an equation 1: 0≤N1−n1≤0.25 or an equation 2: 0.75≤N1−n1<1.

12 Claims, 8 Drawing Sheets

(51) Int. Cl.

| | |
|---|---|
| *F16H 25/22* | (2006.01) |
| *F16K 17/04* | (2006.01) |
| *F02M 3/06* | (2006.01) |
| *F02M 19/12* | (2006.01) |
| *B60G 13/04* | (2006.01) |
| *B60T 13/74* | (2006.01) |
| *B62D 3/12* | (2006.01) |
| *B62D 5/06* | (2006.01) |
| *B62D 5/08* | (2006.01) |
| *B62D 5/10* | (2006.01) |
| *F16D 65/16* | (2006.01) |
| *F16D 121/24* | (2012.01) |
| *F16D 125/40* | (2012.01) |
| *F16D 127/02* | (2012.01) |
| *F16H 25/20* | (2006.01) |

(52) U.S. Cl.
CPC .......... *F02M 19/122* (2013.01); *F16H 19/04* (2013.01); *F16H 25/2204* (2013.01); *F16K 17/0406* (2013.01); *B60T 13/746* (2013.01); *B62D 3/12* (2013.01); *B62D 5/062* (2013.01); *B62D 5/08* (2013.01); *B62D 5/10* (2013.01); *F16D 65/16* (2013.01); *F16D 2121/24* (2013.01); *F16D 2125/40* (2013.01); *F16D 2127/02* (2013.01); *F16F 2228/001* (2013.01); *F16F 2234/02* (2013.01); *F16F 2238/026* (2013.01); *F16H 2025/2068* (2013.01); *F16H 2025/2078* (2013.01)

(58) Field of Classification Search
CPC .... F16F 1/06; F16F 2234/02; F16F 2228/001; F02M 19/122; F02M 3/062; F16H 25/2204; F16H 19/04; F16H 55/283; F16H 2025/2068; F16H 2025/2078; F16D 65/16; F16D 2121/14; F16D 2121/24; F16D 2238/026; F16D 2125/40; F16D 2127/02; B60T 1/062; B60T 13/746; B60G 13/04; B62D 5/08; B62D 5/062; B62D 5/10; B62D 3/12; B62D 3/123
USPC ............... 267/216, 7, 135; 188/67; 137/539; 303/113.1
See application file for complete search history.

(56) References Cited

U.S. PATENT DOCUMENTS

| | | | |
|---|---|---|---|
| 8,696,330 B2 * | 4/2014 | Ohligschlaeger | F04B 53/16 417/416 |
| 2011/0142703 A1 | 6/2011 | Soeda | |
| 2015/0343871 A1 * | 12/2015 | Tange | B60G 11/14 267/286 |
| 2016/0046164 A1 * | 2/2016 | Yamamotoya | F16F 1/06 267/286 |

* cited by examiner

VEHICLE-MOUNTED APPARATUS HAVING BIASING STRUCTURE USING COIL SPRING

TECHNICAL FIELD

The present invention relates to a vehicle-mounted apparatus having a biasing structure using a coil spring.

BACKGROUND ART

As this kind of technique, for example, there is known a variable displacement vane pump discussed in PTL 1. This vane pump includes a relief valve for protecting a hydraulic apparatus from an excessive increase in a pressure. The relief valve includes a coil spring set in a valve hole in a compressed state and configured to bias a ball (a biasing target member) toward a valve seat member side.

CITATION LIST

Patent Literature

[PTL 1] Japanese Patent Application Public Disclosure No. 2012-82762

SUMMARY OF INVENTION

Technical Problem

However, the above-described related technique has a problem of being unable to acquire a stable operation of a valve body when the coil spring applies a biasing force including a great lateral component to the valve body, i.e., the coil spring exerts a great lateral force.

One of objects of the present invention is to provide a vehicle-mounted apparatus having a biasing structure using a coil spring capable of reducing the lateral force of the coil spring that is applied to the biasing target member.

Solution to Problem

According to one aspect of the present invention, a vehicle-mounted apparatus having a biasing structure using a coil spring includes the coil spring provided in a containing portion. The coil spring is configured to bias a biasing target member. The coil spring is set in the containing portion in a compressed state. When N1 and n1 represent the number of effective turns and a value of an integer of the number of effective turns of the coil spring in the compressed state, respectively, and N0 and n0 represent the number of effective turns and a value of an integer of the number of effective turns of the coil spring when a length of the coil spring is a natural length, respectively, the coil spring satisfies $$0 \leq N1 - n1 \leq 0.25$$ an equation 1:

or $$0.75 \leq N1 - n1 < 1.$$ an equation 2:

When the number of effective turns N1 of the coil spring in the compressed state satisfies the equation 1, the coil spring satisfies $$N1 - n1 < N0 - n0.$$ an equation 3:

When the number of effective turns N1 of the coil spring in the compressed state satisfies the equation 2, the coil spring satisfies $$N0 - n0 < N1 - n1.$$ an equation 4:

Therefore, according to the one aspect of the present invention, it is possible to reduce the lateral force of the coil spring that is applied to the biasing target member.

DESCRIPTION OF EMBODIMENTS

First Embodiment

Figure 1:
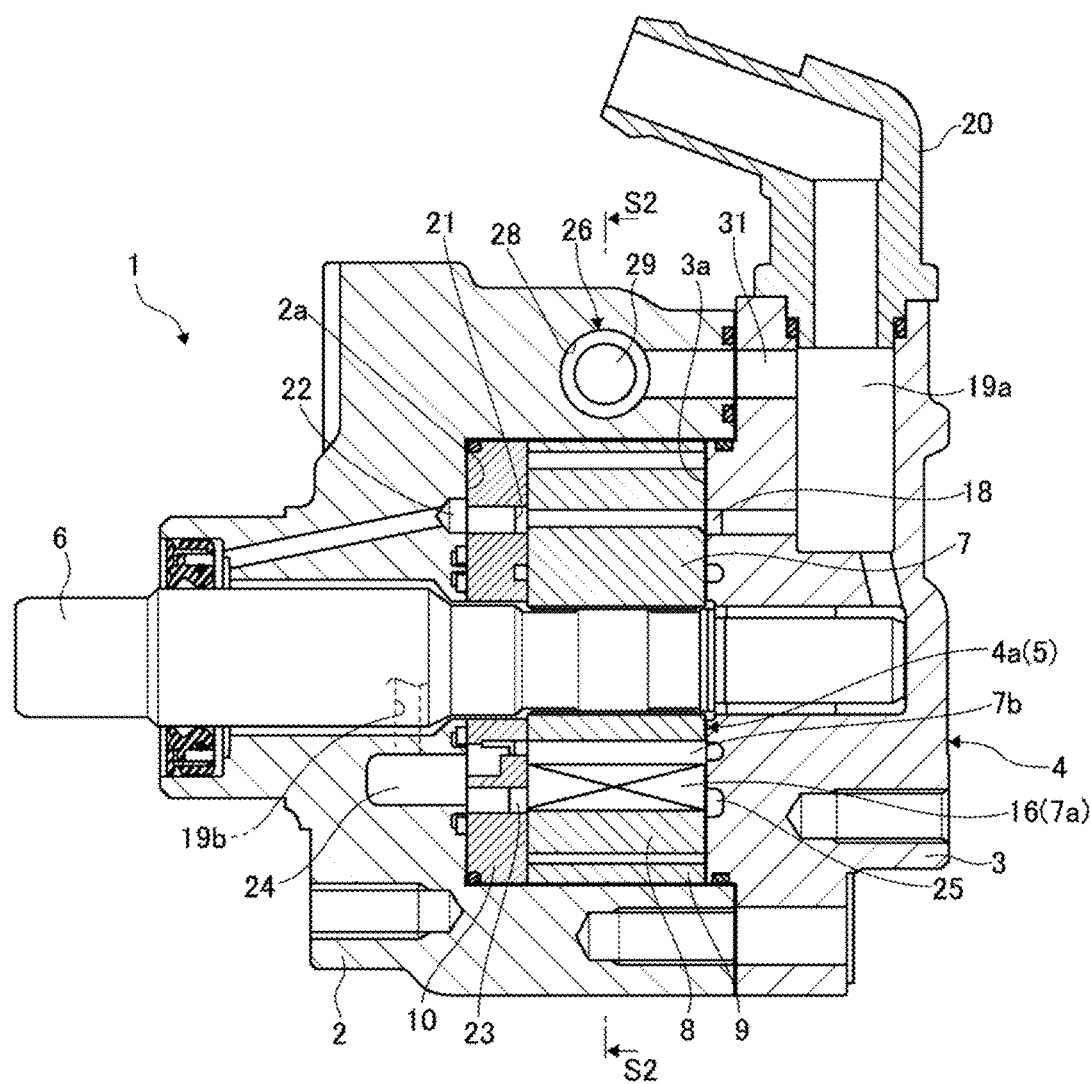
FIG. 1 is an axial cross-sectional view illustrating a variable displacement vane pump 1 according to a first embodiment.
Figure 2:
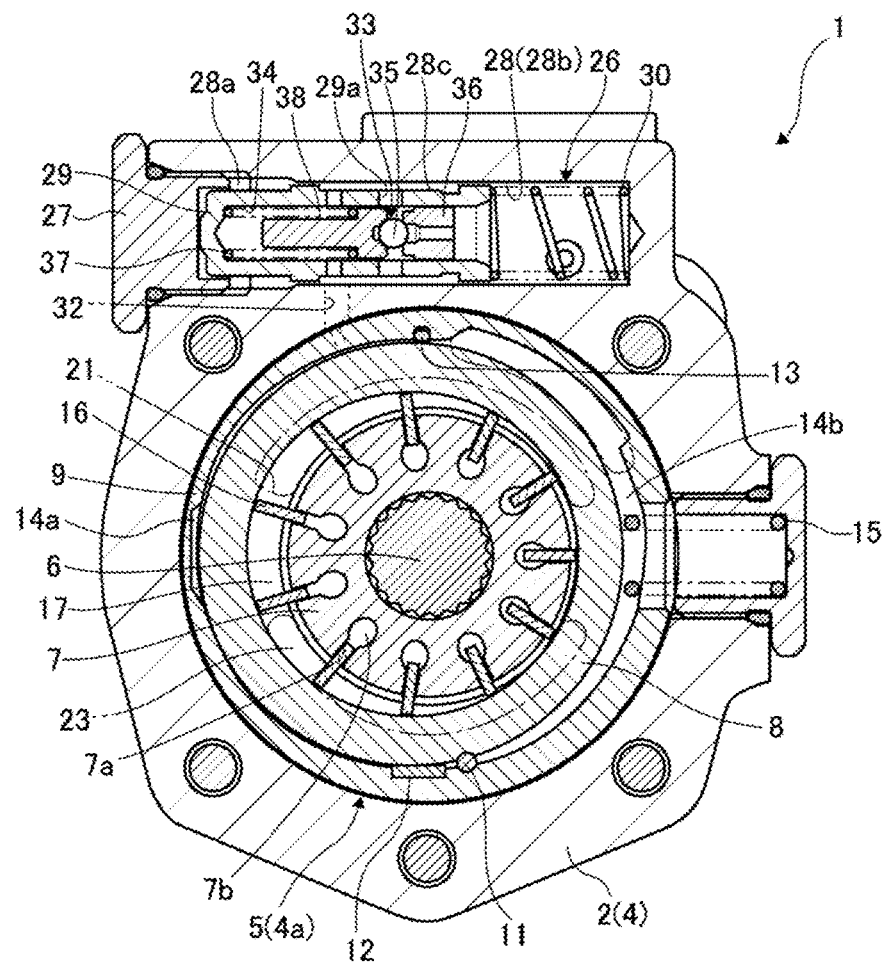
FIG. 2 is a cross-sectional view taken along a line indicated by arrows S2-S2 illustrated in FIG. 1.

FIG. 1 is an axial cross-sectional view illustrating a variable displacement vane pump (a vehicle-mounted apparatus) 1 according to a first embodiment. FIG. 2 is a cross-sectional view taken along a line indicated by arrows S2-S2 illustrated in FIG. 1.

The variable displacement vane pump 1 includes a pump body 4 and a pump element 5. The variable displacement vane pump 1 exerts a pump function by rotationally driving the pump element 5 by a driving shaft 6. The pump body 4 is formed by bringing a front body 2 and a rear body 3 into abutment with each other. The pump body 4 contains the pump element 5 in a containing space 4a. The pump element 5 includes a rotor 7, a cam ring 8, an adapter ring 9, and a pressure plate 10. The rotor 7 rotates integrally with the driving shaft 6. The cam ring 8 is positioned on an outer peripheral side of the rotor 7, and has a generally annular shape. The cam ring 8 is swingable in a direction for changing an eccentricity amount with respect to the rotor 7. The adapter ring 9 is positioned on an outer peripheral side of the cam ring 8, and has a generally annular shape. The adapter ring 9 is fixed to an outer peripheral cylindrical surface of the containing space 4a. The pressure plate 10 is positioned on an inner bottom surface 2a of the front body 2 in the containing space 4a, and has a generally disk-like shape.

The adapter ring 9 and the pressure plate 10 are restricted from rotating relative to the pump body 4 by a positioning pin 11. A plate member 12 is set up on a clockwise side of the positioning pin 11 in FIG. 2 (a first fluid pressure chamber 14a side, which will be described below). The plate member 12 has a function as a supporting point for the swinging movement of the cam ring 8, and a seal function of sealing between the cam ring 8 and the adapter ring 9. A seal member 13 is disposed at a position of an inner peripheral surface of the adapter ring 9 that is located opposite from the plate member 12. The seal member 13 seals between the adapter ring 9 and the cam ring 8. The seal member 13 and the plate member 12 form a pair of fluid pressure chambers 14a and 14b between the cam ring 8 and the adapter ring 9. More specifically, the first fluid pressure chamber 14a and the second fluid pressure chamber 14b are formed on one radial side and the other radial side of the cam ring 8, respectively. The eccentricity amount of the cam ring 8 with respect to the rotor 7 increases and reduces according to the swinging movement of the cam ring 8 due to a pressure difference between these fluid pressure chambers 14a and 14b. The cam ring 8 is constantly biased by a return spring 15 in a direction for maximizing the eccentricity amount with respect to the rotor 7.

The rotor 7 includes a plurality of slots 7a cutout along a radial direction on an outer peripheral portion thereof. The individual slots 7a are arranged at circumferentially equal intervals. A vane 16 having a generally flat plate-like shape is contained in each of the slots 7a in a projectable and retractable manner in the radial direction of the rotor 7. Each of the vanes 16 partitions an annular space between the cam ring 8 and the rotor 7 circumferentially, by which a plurality of pump chambers 17 is formed. Rotationally driving the rotor 7 in a counterclockwise direction in FIG. 2 by the driving shaft 6 causes each of the pump chambers 17 to engage in a circling movement while increasing and reducing a volume thereof, thereby achieving the pump function. Each of the vanes 16 is pressed against an inner peripheral surface of the cam ring 8 by a pressure of hydraulic oil introduced into a back-pressure chamber 7b formed on an inner peripheral side of each of the slots 7a.

A first intake port 18 generally crescent-shaped in a front view along the circumferential direction is formed in a portion corresponding to an intake region in which the volume of each of the pump chambers 17 gradually increases according to the rotation of the rotor 7 on an inner surface 3a of the rear body 3 that faces the containing space 4a. The first intake port 18 is in communication with an intake passage 19a formed in the rear body 3. Due to this configuration, the hydraulic oil introduced into the intake passage 19a via an intake pipe 20 connected to a not-illustrated reservoir tank is suck into each of the pump chambers 17 due to a pump intake function in the above-described intake region.

A second intake port 21 is formed at a position opposite from the first intake port 18 on a surface of the pressure plate 10 that faces the rotor 7. The second intake port 21 is shaped approximately identically to this first intake port 18. The second intake port 21 is in communication with a return flow passage 22 formed in the front body 2. The return flow passage 22 is in communication with a recessed portion of the front body 2 that contains a seal member sealing between the front body 2 and the driving shaft 6. Extra oil of the above-described seal member is supplied into each of the pump chambers 17 due to the intake function in the above-described intake region, thereby being prevented from leaking outward.

A first discharge port 23 generally crescent-shaped in the front view along the circumferential direction is formed in a portion corresponding to a discharge region in which the volume of each of the pump chambers 17 gradually reduces according to the rotation of the rotor 7 on a surface of the pressure plate 10 that faces the rotor 7. The first discharge port 23 is in communication with a discharge passage 19b via a pressure chamber 24 formed in a recessed manner on the inner bottom surface 2a of the front body 2 that faces the pressure plate 10. Due to this configuration, the hydraulic oil discharged from each of the pump chambers 17 due to a pump discharge function in the above-described discharge region is discharged outside the pump body 4 via the pressure chamber 24 and the discharge passage 19b, and is transmitted to a hydraulic power cylinder of a not-illustrated power steering apparatus. The pressure plate 10 is pressed toward the rotor 7 side by the pressure in the pressure chamber 24.

A second discharge port 25 is formed at a position on the inner surface 3a of the rear body 3 that is located opposite from the first discharge port 23. The second discharge port 25 is shaped approximately identically to this first discharge port 23. These intake ports 18 and 21 and these discharge ports 23 and 25 are each disposed axially symmetrically with respect to each of the pump chambers 17, and this layout allows pressure balance to be maintained on both axial sides of each of the above-described pump chambers 17.

A control valve 26 is provided in a direction perpendicular to the driving shaft 6 (a left-right direction in FIG. 2) inside an upper end side of the front body 2. The control valve 26 controls a pump discharge pressure. The control valve 26 is formed on the front body 2 from a left side toward a right side in FIG. 2. The control valve 26 includes a valve hole 28, a spool (a housing member) 29, and a control valve spring 30. An opening portion of the valve hole 28 on the left side in FIG. 2 is closed by a plug (a restriction portion) 27. The spool 29 is axially slidably contained in the valve hole 28. The spool 29 is a spool valve body having a generally bottomed cylindrical shape. The control valve spring 30 biases the spool 29 toward the plug 27 side. The control valve spring 30 is a cylindrical compression coil spring.

A high-pressure chamber (a second hydraulic fluid passage) 28a, and an intermediate-pressure chamber 28b and a low-pressure chamber (a first hydraulic fluid passage) 28c are defined by the spool 29 in the valve hole 28. A hydraulic pressure on an upstream side of a not-illustrated metering orifice formed in the discharge passage 19b, i.e., the hydraulic pressure in the pressure chamber 24 is introduced into the high-pressure chamber 28a. The intermediate-pressure chamber 28b contains the control valve spring 30, and a hydraulic pressure on a downstream side of the above-described metering orifice is introduced into the intermediate-pressure chamber 28b. The low-pressure chamber 28c is formed on an outer peripheral side of the spool 29, and a pump intake pressure is introduced from the intake passage 19a into the low-pressure chamber 28c via a low-pressure passage 31.

The spool 29 is axially moved according to a pressure difference between the intermediate-pressure chamber 28b and the high-pressure chamber 28a. More specifically, when the pressure difference between the intermediate-pressure chamber 28b and the high-pressure chamber 28a is relatively low and the spool 29 is in a state in abutment with the plug 27 (a first state), a communication passage (the first hydraulic fluid passage and the second hydraulic fluid passage) 32, which establishes communication between the first fluid pressure chamber 14a and the valve hole 28, is opened to the low-pressure chamber 28c, and a relatively low hydraulic pressure in the low-pressure chamber 28c is introduced into the first fluid pressure chamber 14a. On the other hand, when the pressure difference between the intermediate-pressure chamber 28b and the high-pressure chamber 28a increases and the spool 29 is axially moved against the biasing force of the control valve spring 30 (a second state), the communication between the low-pressure chamber 28c and the first fluid pressure chamber 14a is gradually blocked and the high-pressure chamber 28a is brought into communication with the first fluid pressure chamber 14a via the communication passage 32. As a result, a relatively high hydraulic pressure in the high-pressure chamber 28a is introduced into the first fluid pressure chamber 14a. In other words, the hydraulic pressure in the low-pressure chamber 28c or the high-pressure chamber 28a is selectively introduced into the first fluid pressure chamber 14a.

A pump intake pressure is constantly introduced into the second fluid pressure chamber 14b. When the hydraulic pressure in the low-pressure chamber 28c is introduced into the first fluid pressure chamber 14a, the cam ring 8 is located due to the biasing force of the return spring 15 at a position where the eccentricity amount with respect to the rotor 7 is maximized (the position on the left side in FIG. 2). At this time, the pump discharge amount is maximized. On the other hand, when the hydraulic pressure in the high-pressure chamber 28a is introduced into the first fluid pressure chamber 14a, the cam ring 8 swings so as to reduce a volume of the second fluid pressure chamber 14b against the biasing force of the return spring 15 due to the pressure in this first fluid pressure chamber 14a, thereby reducing the eccentricity amount between this cam ring 8 and the rotor 7. The pump discharge amount reduces according to the reduction in the eccentricity amount.

A relief valve 33 is formed inside the spool 29. The relief valve 33 is maintained in a valve-closed state (the first state) when the pressure in the intermediate-pressure chamber 28b is lower than a predetermined pressure. When the pressure in the intermediate-pressure chamber 28b reaches or exceeds the predetermined pressure, i.e., a pressure on the power steering apparatus side (a load side) reaches or exceeds the predetermined pressure, the relief valve 33 is brought into a valve-opened state (the second state) to start a relief operation, thereby causing the hydraulic oil to return to the intake passage 19a via the low-pressure chamber 28c and the low-pressure passage 31. In other words, the relief valve 33 opens and closes an oil passage between the discharge passage 19b and the intake passage 19a.

Figure 3:
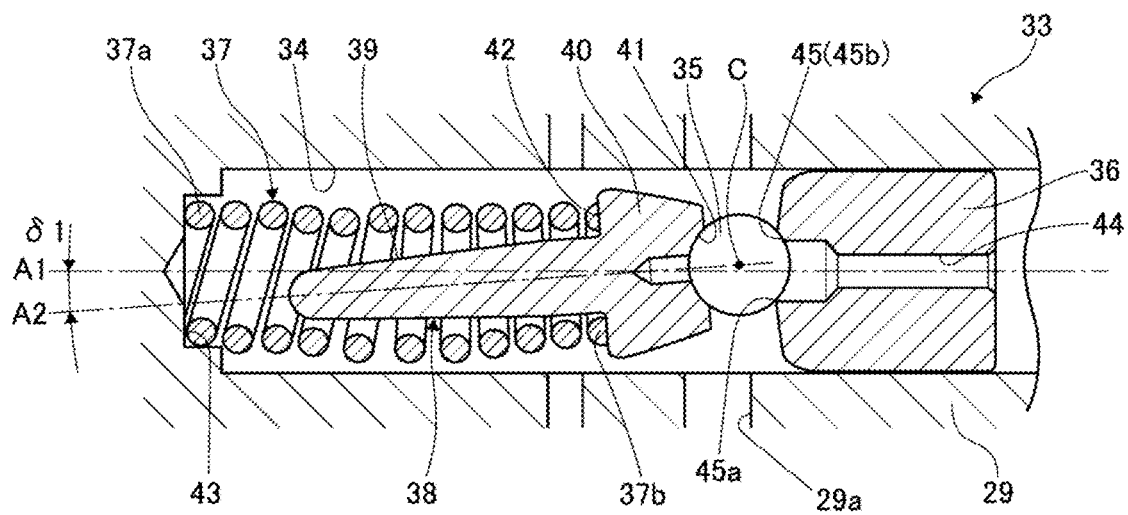
FIG. 3 is an enlarged view illustrating details of a relief valve 33 according to the first embodiment.

FIG. 3 is an enlarged view illustrating details of the relief valve 33 according to the first embodiment. The relief valve 33 includes a valve hole (a containing portion) 34, a relief hole (a hydraulic fluid passage) 29a, a ball (the biasing target member) 35, a valve seat member (the restriction portion) 36, a relief valve spring 37, and a retainer 38. The valve hole 34 is formed on an inner peripheral side of the spool 29, and has a generally cylindrical shape. The relief hole 29a is formed in the spool 29 so as to establish communication between the valve hole 34 and the low-pressure chamber 28c. The ball 35 is a spherical valve body disposed in the valve hole 34. The valve seat member 36 is a valve seat which the ball 35 is in abutment with, and is fixed on one axial side of the ball 35 in the valve hole 34. The relief valve spring 37 is disposed in a compressed and deformed state on the other side of the ball 35 in the valve hole 34. The relief valve spring 37 is a coil spring having a non-linear deformation characteristic, and is assumed to be a barrel-shaped spring in the first embodiment. The retainer 38 is disposed between the ball 35 and the relief valve spring 37. The retainer 38 biases the ball 35 toward the valve seat member 36 side due to a recovery force based on the compression deformation of the relief valve spring 37. The retainer 38 includes a shaft portion 39 and a ball holding portion 40. The shaft portion 39 is inserted on an inner peripheral side of the relief valve spring 37. The ball holding portion 40 is formed so as to have an increased diameter at an end portion of the shaft portion 39 on the valve seat member 36 side thereof, and is seated on a second end turn portion 37b of the relief valve spring 37 on the valve seat member 36 side thereof.

The shaft portion 39 is formed in a tapering manner of gradually increasing in diameter toward the ball holding portion 40 side. A radial relative displacement between the second end turn portion 37b and the retainer 38 is restricted due to abutment between an outer peripheral surface of the shaft portion 39 on a base portion thereof with respect to the ball holding portion 40 and the second end turn portion 37b of the relief valve spring 37.

The ball holding portion 40 holds the ball 35 in a ball holding recessed portion 41 formed in a recessed manner on an end surface of the ball holding portion 40 on the shaft portion 39 side thereof. The ball holding portion 40 includes a stepped portion 42 between the ball holding portion 40 and the shaft portion 39, which is seated on the second end turn portion 37b of the relief valve spring 37. The ball holding recessed portion 41 is formed into a generally flattened truncated conical shape rotationally symmetric around an axis A2 of the retainer 38. The ball 35 is seated on the ball holding recessed portion 41, by which a radial relative displacement between this ball 35 and the retainer 38 is restricted and a center C of the ball 35 is positioned on the axis A2 of the retainer 38.

On the other hand, a circularly recessed spring seat portion 43 is formed on a bottom portion of the valve hole 34. The spring seat portion 43 has an axis that coincides with an axis A1 of the valve hole 34. A first end turn portion 37a of the relief valve spring 37 on the valve seat member 36 side thereof is seated on the spring seat portion 43, by which an axis of the first end turn portion 37a and the axis A1 of the valve hole 34 coincide with each other.

The valve seat portion 36 includes a through-hole 44 and a seat surface (a valve seat portion) 45. The through-hole 44 is formed along the axis A1 of the valve hole 34, and is in communication with the discharge passage 19b via the intermediate-pressure chamber 28b. The through-hole 44 is positioned approximately at a center of a generally circular cross section of the valve hole 34. The seat surface 45 is annular, and is formed at an end portion of an opening portion 44a of the through-hole 44 that is located on the ball 35 side and has an increased diameter. The relief valve 33 is closed by the ball 35 being seated on the seat surface 45.

The seat surface 45 is formed in such a manner that, when the relief valve 33 is closed, i.e., the ball 35 is seated on the seat surface 45, the center C of the ball 35 is offset by a predetermined offset amount in a radial direction with respect to the axis A1 of the valve hole 34 that is shared with the first end turn portion 37a and the through-hole 44. As a result, the ball holding portion 40 of the retainer 38 is offset in the radial direction with respect to the axis A1 of the valve hole 34, and the axis A2 of the retainer 38 is tilted by an angle δ1 with respect to the axis A1 of the valve hole 34.

Further, the seat surface 45 is formed so as to satisfy F1>F2+F3, when F1, F2, and F3 are assumed to represent a component in the radial direction with respect to the axis A1 that is included in a hydraulic pressure in the through-hole 44 that the ball 35 receives in a region on an inner side with respect to the seat surface 45, a force in the radial direction with respect to the axis A1 that reduces F11 according to the tilt of the ball 35 with respect to the axis A1, and a force of the biasing force of the relief valve spring 37 in the radial direction with respect to the axis A1 that reduces F11 (a lateral force), respectively. When F2+F3, which is a sum of the components of the forces reducing the radial component F1 of the hydraulic fluid that the ball 35 receives, exceeds F1, this makes the ball 35 instable and causes generation of strange noise from the relief valve 33, so that forming the seat surface 45 so as to satisfy F1>F2+F3 can keep the ball 35 stabilized when the relief valve 33 is opened, thereby preventing or reducing the generation of the strange noise from the relief valve 33.

In the variable displacement vane pump 1 according to the first embodiment, the center C of the ball 35 is offset in the radial direction with respect to the axis A1 of the valve hole 34 and the axis A2 of the retainer 38 is tilted with respect to the axis A1 when the relief valve 33 is opened. This makes it easy for the ball 35 to be opened toward one side in the radial direction with respect to the axis A1 when the relief valve 33 is opened. Therefore, the ball 35 is partially kept in the state in abutment with the seat surface 45 even when the valve is opened, thereby maintaining a stabilized valve-opened state in which the ball 35 is sandwiched between the retainer 38 and the seat surface 45. As a result, the variable displacement vane pump 1 can prevent or reduce a vibration of the ball 35 when the relief valve 33 is opened, thereby preventing or reducing the generation of the strange noise from the relief valve 33.

Now, if the lateral force of the relief valve spring 37 that is applied to the ball 35 is generated in the direction for separating the ball 35 from the seat surface 45 when the relief valve 33 is opened, the ball 35 becomes more instable as this lateral force increases, which leads to a reduction in the above-described effect of preventing or reducing the strange noise. Therefore, in the first embodiment, the relief valve spring 37 is designed so as to satisfy conditions expressed by the following equation 1 and equation 3 with the aim of reducing the lateral force of the relief valve spring 37.

$$0 \leq N1 - n1 \leq 0.25 \quad \text{Equation 1:}$$

$$N1 - n1 < N0 - n0 \quad \text{Equation 3:}$$

In these equations, N1, n1, N0, and n0 represent the number of effective turns when the relief valve spring 37 is set in the valve hole 34 of the spool 29 in the compressed state, a value of an integer of N1, the number of effective turns when the relief valve spring 37 has a natural length, and a value of an integer of N0, respectively.

The relief valve spring 37 satisfying the conditions expressed by the equation 1 and the equation 3 can reduce the lateral force for the following reason.

Figure 4:
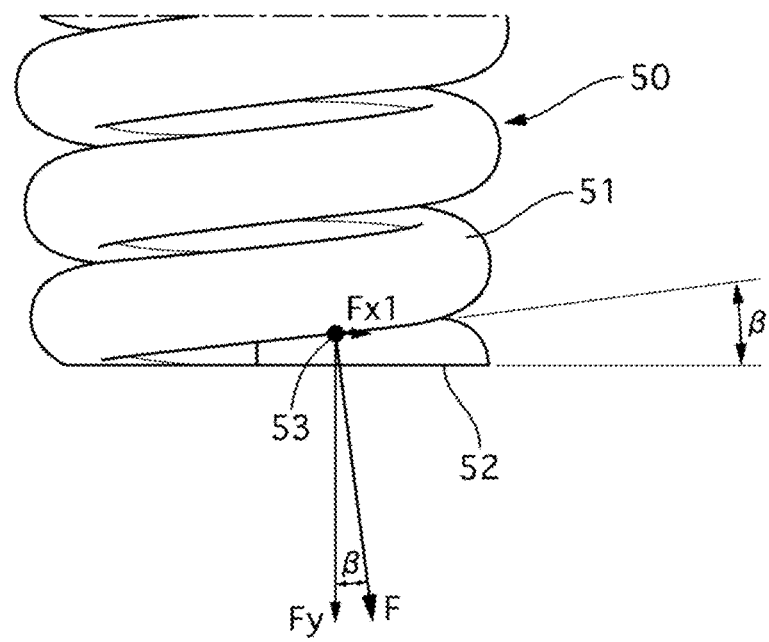
FIG. 4 illustrates a state of an end portion when a load is applied to a cylindrical compression coil spring (hereinafter referred to as a coil spring) 50.
Figure 5:
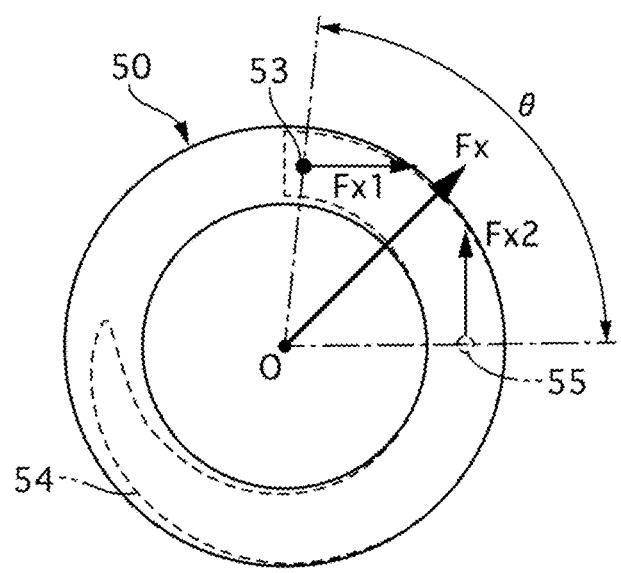
FIG. 5 illustrates the coil spring 50 as viewed from one axial side.

FIG. 4 illustrates a state of an end portion when a load is applied to a commonly-used cylindrical compression coil spring (hereinafter referred to as a coil spring) 50. The coil spring 50 includes a spring portion 51 and an end turn portion 52. The spring portion 51 is a portion working as a spring. The end turn portion 52 is a flat portion formed at each of both ends of the spring portion 51, and is a portion not working as the spring. When a load (a compression load) is applied to the coil spring 50 on one side of the coil spring 50, an elastic force F of the spring portion 51 is applied to a contact point 53 between the spring portion 51 and the end turn portion 52. The elastic force F is angled only by a pitch angle β with respect to an axial direction of the coil spring 50. Therefore, an axial component Fy of the elastic force F applied to the contact point 53 and a component Fx1 thereof in a direction perpendicular to the axis are expressed as Fy=F cos β and Fx1=F sin β, respectively. As illustrated in FIG. 5, the component Fx1 in the direction perpendicular to the axis is applied in a direction extending from the end turn portion 52 toward the spring portion 51 among tangent directions of a circle passing through the contact point 53 and centered on a central axis O of the coil spring 50 when the coil spring 50 is viewed from one axial side. The same also applies to the end turn portion 54 and the contact point 55 on the other side of the coil spring 50. Therefore, the lateral force Fx of the coil spring 50 is applied as a resultant force of the component Fx1 in the direction perpendicular to the axis of the elastic force F applied to the contact point 53 and the component Fx2 in the direction perpendicular to the axis of the elastic force F applied to the contact point 55 on the other side.

In the above-described manner, theoretically, the components Fx1 and Fx2 in the directions perpendicular to the axis at these contact points 53 and 55 have equal strengths, but have varying orientations depending on a positional relationship between these contact points 53 and 55 when being viewed from the axial direction. More specifically, the lateral force Fx of the coil spring 50 changes in strength and orientation depending on a relative angle θ between these contact points 53 and 55. The relative angle θ between the two contact points is an angle formed between a straight line passing through the central axis O and the contact point 53 and a straight line passing through the central axis O and the contact point 55.

Figure 6:
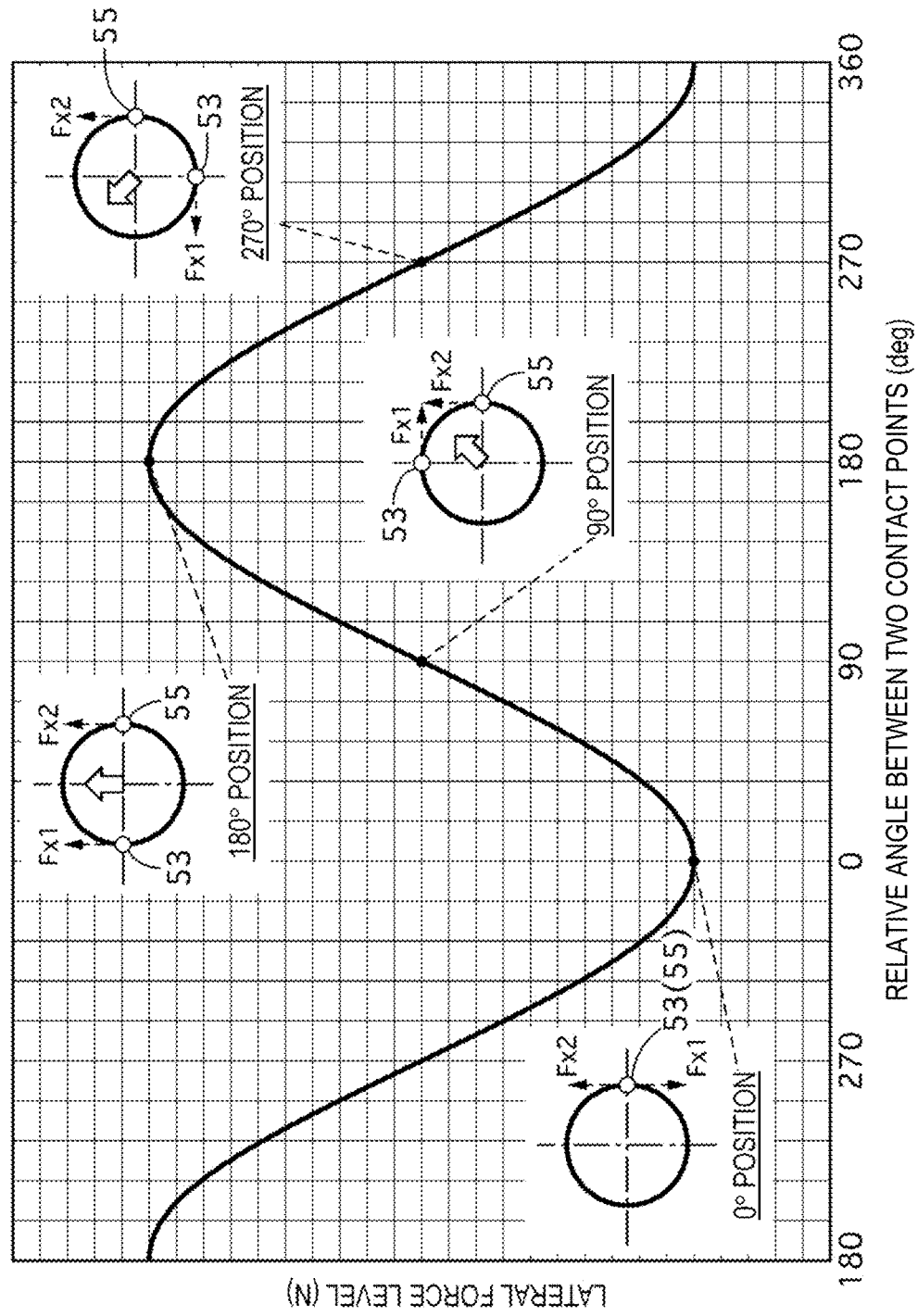
FIG. 6 illustrates a relationship between a relative angle [degrees] between two contact points and a lateral force level [N] on the coil spring 50.

FIG. 6 illustrates a relationship between the relative angle θ [degrees] between the two contact points and a lateral force level (an absolute value of the lateral force Fx) [N] on the coil spring 50. As illustrated in FIG. 6, the lateral force level has a generally sinusoidal characteristic with respect to the relative angle θ between the two contact points. When the relative angle θ between the two contact points is 0 degrees, the lateral force level is minimized because the two components Fx1 and Fx2 in the directions perpendicular to the axis are oriented in opposite directions from each other. On the other hand, when the relative angle θ between the two contact points is 180 degrees, the lateral force level is maximized because the two components Fx1 and Fx2 in the directions perpendicular to the axis are oriented in the same direction as each other. Further, when the relative angle θ between the two contact points is 90 degrees or 270 degrees, the lateral force level exhibits an intermediate value because the two components Fx1 and Fx2 in the directions perpendicular to the axis are oriented perpendicularly to each other.

Therefore, the lateral force of the coil spring 50 can be reduced by setting the relative angle θ between the two contact points within a range of 0 degrees≤θ≤90 degrees or 270 degrees≤θ≤360 degrees. To satisfy this condition, a value after the decimal point of the number of effective turns N of the coil spring 50 should fall within a range of 0 to 0.25 or a range of 0.75 to 1.

Figure 7:
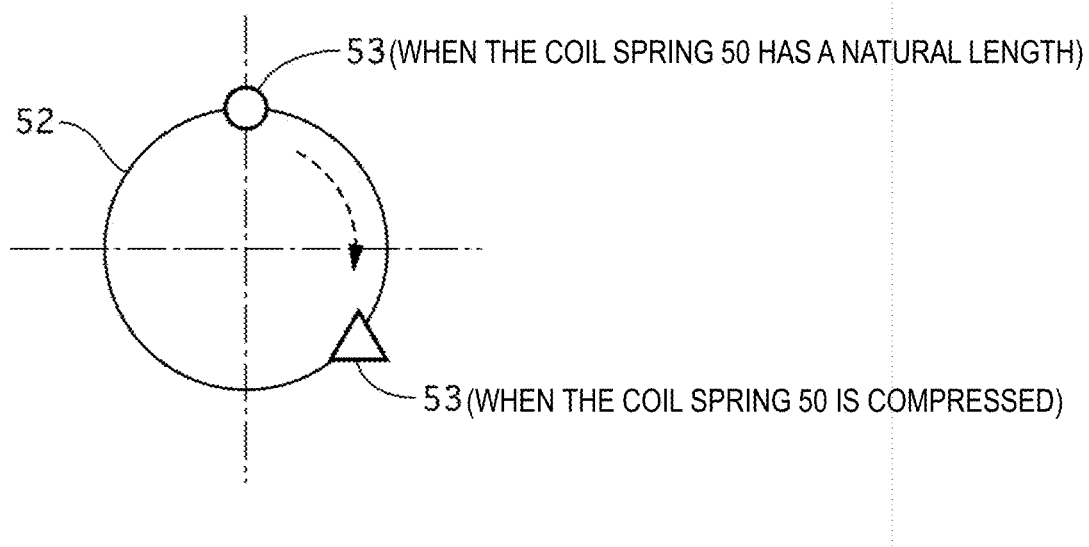
FIG. 7 illustrates a change in a position of a contact point 53 on one side when the coil spring 50 is compressed.
Figure 8:
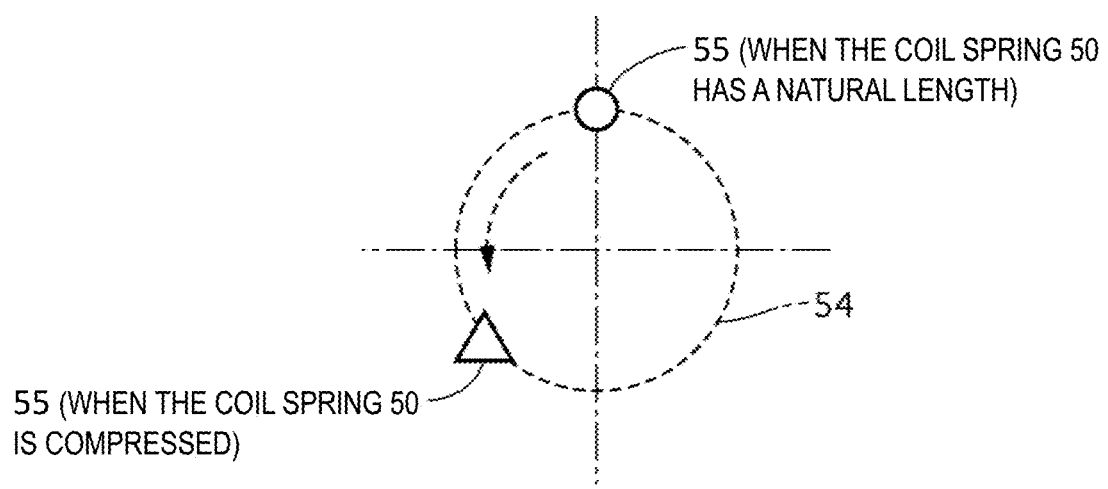
FIG. 8 illustrates a change in a position of a contact point 55 on the other side when the coil spring 50 is compressed.

On the other hand, the number of effective turns N of the coil spring 50 reduces when the coil spring 50 is compressed. In other words, both the contact points 53 and 55 of the coil spring 50 change according to the compressed state. As illustrated in FIG. 7, the contact point 53 on the one side changes from a position indicated by a circle to a position indicated by a triangle in FIG. 7 when the coil spring 50 is compressed, when the coil spring 50 is viewed from the one axial side. Further, as illustrated in FIG. 8, the contact point 55 on the other side changes from a position indicated by a circle to a position indicated by a triangle in FIG. 8 when the coil spring 50 is compressed, when the coil spring 50 is viewed from the one axial side. Therefore, in the case where the employed biasing structure is configured to bias the biasing target member with the coil spring 50 set in the containing portion in the compressed state, the number of effective turns in the set state should more closely approach an integer than the number of effective turns in the natural length state before the coil spring 50 is set, and have the value after the decimal point that falls within the range of 0 to 0.25 or the range of 0.75 to 1. Then, the above-described conditions can be satisfied by designing the coil spring 50 so as to satisfy the conditions expressed by the following equations 1 and 3 or satisfy conditions expressed by the following equations 2 and 4 when N1, n1, N0, and n0 represent the number of effective turns of the coil spring 50 in the set state, the value of the integer of N1, the number of effective turns in the natural length state, and the value of the integer of N0, respectively.

$$0 \leq N1 - n1 \leq 0.25 \quad \text{Equation 1:}$$

$$0.75 \leq N1 - n1 < 1 \quad \text{Equation 2:}$$

$$N1 - n1 < N0 - n0 \quad \text{Equation 3:}$$

$$N0 - n0 < N1 - n1 \quad \text{Equation 4:}$$

Due to this design, the number of effective turns N1 of the coil spring 50 in the set state can more closely approach an integer than the number of effective turns N0 in the natural length state before the coil spring 50 is set, and have a value around an integer. Therefore, the present configuration can reduce the lateral force of the coil spring 50 to a weak force, thereby biasing the biasing target member further straight and thus improving operability of the biasing target member.

Figure 9:
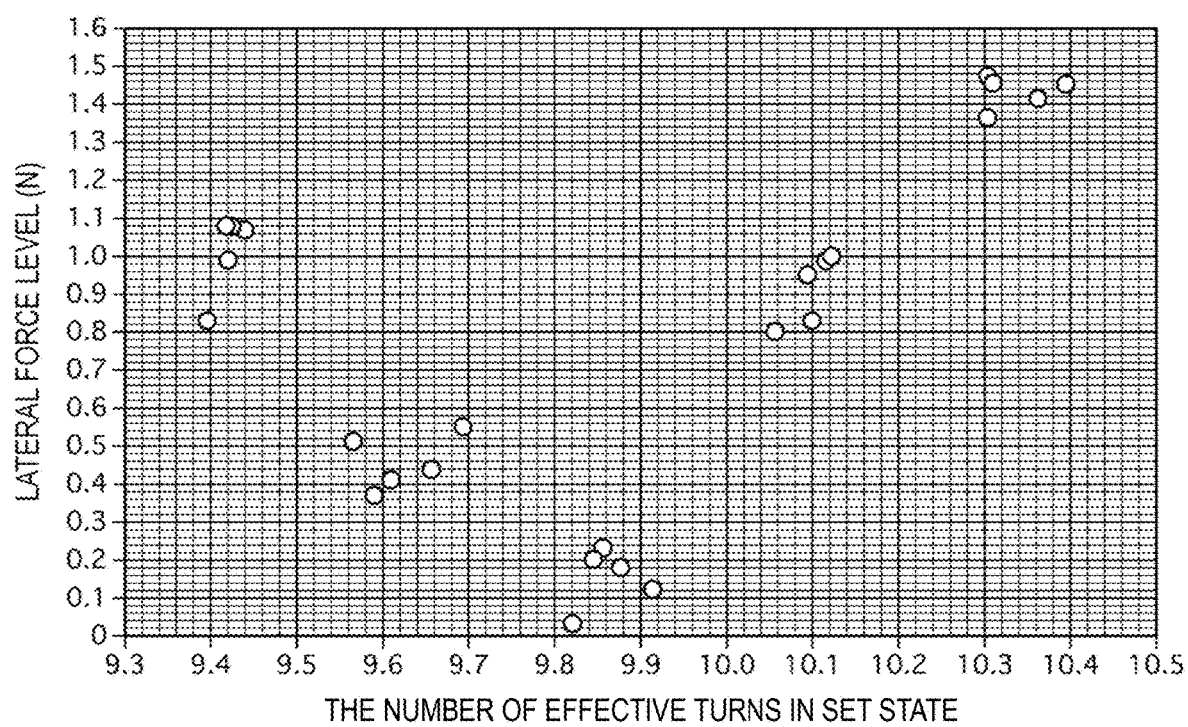
FIG. 9 illustrates verification data of the lateral force level [N] with respect to the number of effective turns N1 with a relief valve spring 37 in a set state.

From the above-described reasons, in the variable displacement vane pump 1 according to the first embodiment, the relief valve spring 37 of the relief valve 33 is designed so as to satisfy the equation 1 and the equation 3. As a result, the variable displacement vane pump 1 can reduce the lateral force of the coil spring 50 when the relief valve 33 is opened. FIG. 9 illustrates verification data of the lateral force level [N} with respect to the number of effective turns N1 with the relief valve spring 37 in the set state. As clearly understood from FIG. 9, the lateral force level was minimized when the number of effective turns N1 was located around an integer (10). This verification data indicates the lateral force level when the number of effective turns N1 fell within a range of 9.3 to 10.5, but a similar result was yielded even when the number of effective turns N1 fell within another range.

The ball 35 of the relief valve 33 is movably provided in the valve hole 34 with a predetermined clearance generated from the valve hole 34. Therefore, the operation state of the ball 35 is largely affected by the lateral force of the relief valve spring 37. Therefore, the operability of the ball 35 can be improved by reducing the lateral force of the relief valve spring 37. Further, the relief valve 33, which is the one-way valve, may cause the strange noise if being tilted due to the influence of the lateral force of the relief valve spring 37 and losing stability of the posture when being opened by the pressure of the hydraulic fluid. Therefore, the stable operation of the ball 35 can be acquired by reducing the lateral force of the relief valve spring 37. Further, the present configuration can prevent or reduce the vibration of the ball 35 when the valve is opened, thereby preventing or reducing the generation of the strange noise from the relief valve 33.

Further, when the relief valve spring 37 is compressed further from the set state according to the operation of the ball 35, the number of effective turns of the relief valve spring 37 in this compressed state further closely approaches an integer (the value after the decimal point reduces), and therefore the lateral force of the relief valve spring 37 can be further reduced compared to when the relief valve spring 37 satisfies the equation 2 and the equation 4.

In the first embodiment, the relief valve spring 37 has the non-linear deformation characteristic. A non-linear coil spring is less prone to be tilted compared to a coil spring having a linear deformation characteristic, and therefore the lateral force can be further reduced. Further, the relief valve spring 37 is configured as the barrel-shaped spring. The barrel-shaped spring is smaller in diameter at both the end portions than at the central portion, and therefore is higher in stiffness at both the end portions than at the central portion. Therefore, a compression rate with respect to the load is higher at the central portion than at both the end portions, so that the lateral force can be prevented from increasing with the number of effective turns separated away from a value around an integer when the relief valve spring 37 is compressed further from the set state. Further, an amount of a change in the number of effective turns between before and after the relief valve spring 37 is set is an uncertain element, and therefore is preferable to be as small as possible. Therefore, the present configuration uses the barrel-shaped spring as the relief valve spring 37, thereby reducing a winding pitch around the end turn portion and increasing the winding pitch at the spring portion, thus causing the relief valve spring 37 to be compressed mainly in a region corresponding to the number of effective turns before and after the relief valve spring 37 is set. The change in the number of effective turns between before and after the relief valve spring 37 is set can be reduced because the change in the number of effective turns according to the compression is also small in a region where the winding pitch is large (the pitch angle β is large). As a result, the increase in the lateral force can be prevented.

Second Embodiment

Figure 10:
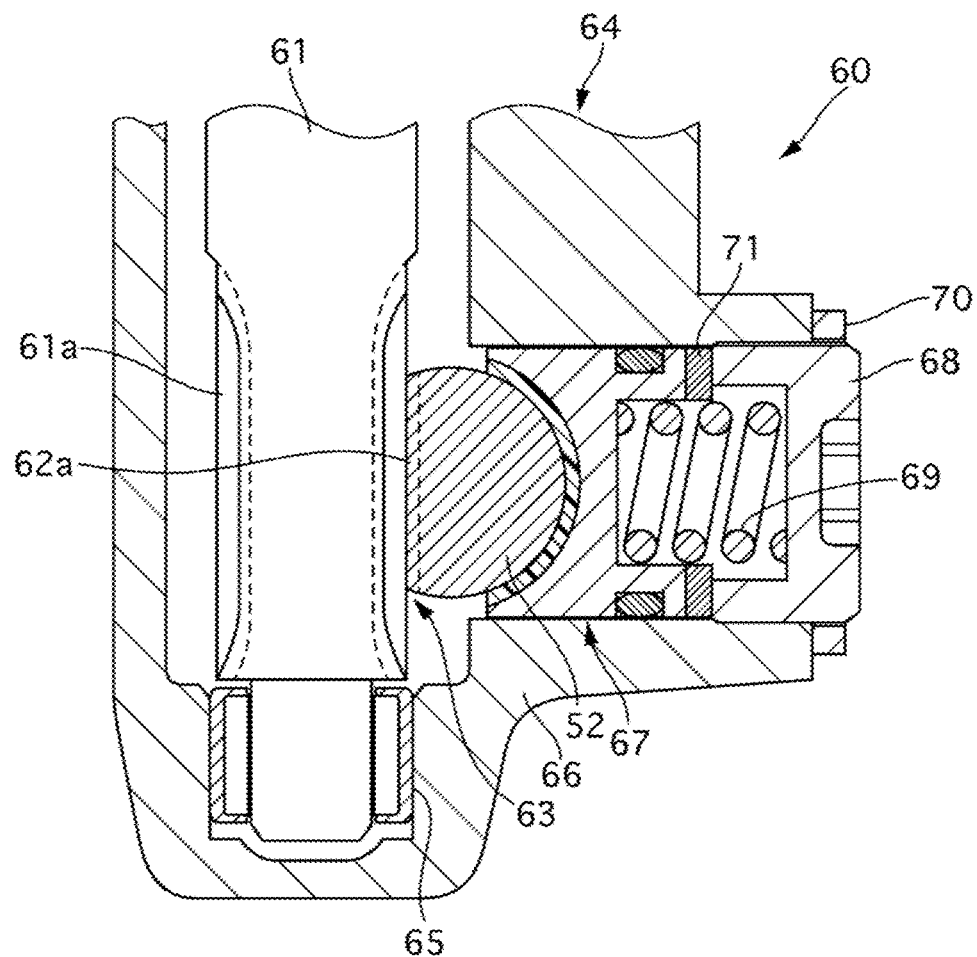
FIG. 10 is a cross-sectional view of main portions that illustrates a rack and pinion steering apparatus 60 according to a second embodiment.

FIG. 10 is a cross-sectional view of main portions that illustrates a rack and pinion steering apparatus 60 (the vehicle-mounted apparatus) according to a second embodiment.

A pinion shaft 61 is connected to a not-illustrated steering wheel. A pinion gear 61a is formed at a distal end of the pinion shaft 61. A rack bar 62 extends in a vehicle lateral direction, and both ends thereof are connected to front wheels. A rack gear 62a, which is meshed with the pinion gear 61a, is formed on the rack bar 62. A rotational input to the steering wheel is converted into an axial movement of the rack bar 62 by a rack and pinion mechanism 63 including the pinion shaft 61 and the rack bar 62, and the front wheels are turned thereby.

A housing (the housing member) 64 contains the rack and pinion mechanism 63. A lower end of the pinion shaft 61 is supported by a bearing 65 installed in the housing 64. A rack retainer containing portion 66 is formed on an opposite side of the rack bar 62 from the pinion shaft 61 in the housing 64. The rack retainer containing portion 66 extends in a vehicle longitudinal direction (a left-right direction in FIG. 10). The rack retainer containing portion (the containing portion) 66 contains a rack retainer (the biasing target member) 67, an adjustment screw 68, and a coil spring 69. The rack retainer 67 is in abutment with the rack bar 62, and is slidable in the vehicle longitudinal direction in the rack retainer containing portion 66. The adjustment screw 68 closes an opening end of the rack retainer containing portion 66. The coil spring 69 is a cylindrical compression coil spring, and is set in a compressed state between the rack retainer 67 and the adjustment screw 68 in the rack retainer containing portion 66. The coil spring 69 biases the rack bar 62 toward the pinion shaft 61 side via the rack retainer 67. A set load of the coil spring 69 can be adjusted by moving the adjustment screw 68 forward and rearward in the vehicle longitudinal direction. The adjustment screw 68 is restricted from being moved relative to the housing 64 in the vehicle longitudinal direction by a lock nut 70. A rubber ring 71 is disposed between the rack retainer 67 and the adjustment screw 68. The rubber ring 71 biases the rack bar 62 toward the pinion shaft 61 side via the rack retainer 67 together with the coil spring 69.

The coil spring 69 according to the second embodiment is designed so as to satisfy the conditions expressed by the equation 1 and the equation 3 described in the first embodiment. Due to this design, the number of effective turns N1 of the coil spring 69 in the set state can more closely approach an integer than the number of effective turns N0 in the natural length state before the coil spring 69 is set, and have a value around an integer. Therefore, the present configuration can reduce the lateral force of the coil spring 69 to a weak force, thereby preventing or reducing a tilt of the rack retainer 67 and thus improving operability of the rack retainer 67.

Third Embodiment

Figure 11:
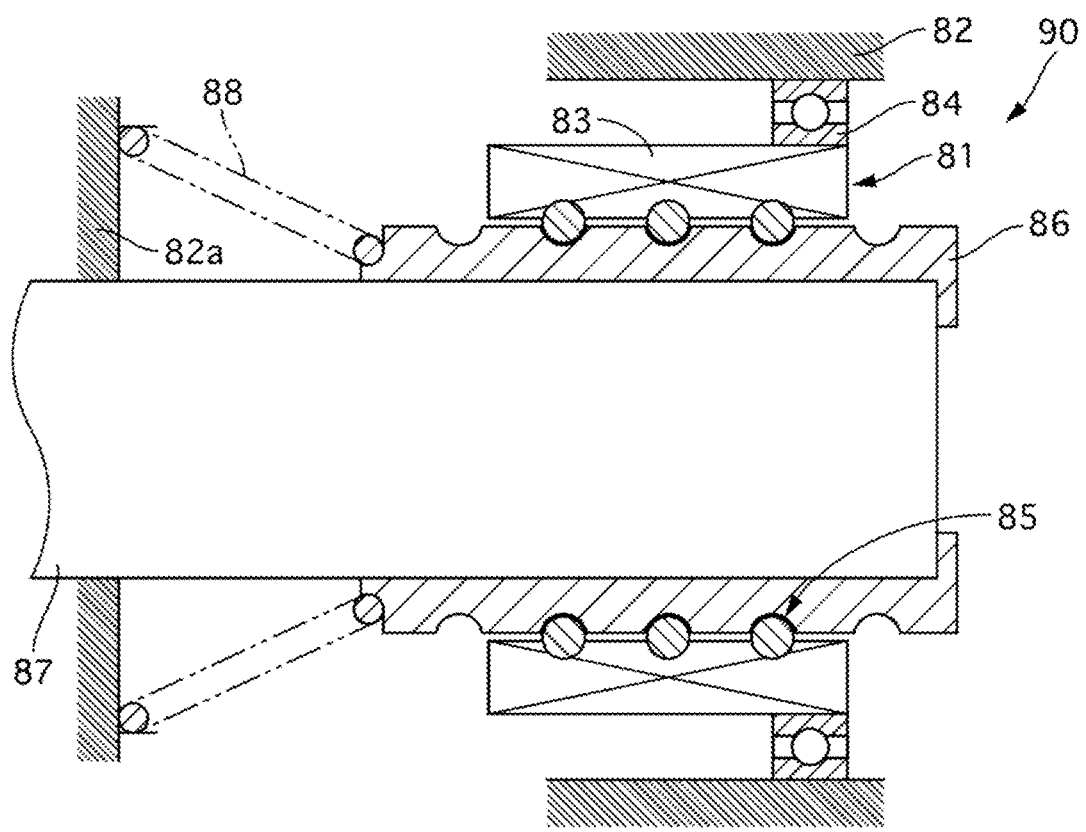
FIG. 11 is a cross-sectional view of main portions that illustrates an electric brake 80 according to a third embodiment.

FIG. 11 is a cross-sectional view of main portions that illustrates an electric brake (the vehicle-mounted apparatus) 80 according to a third embodiment.

A coaxial motor 81 includes a stator fixed to a housing (the housing member) 82, and a nut (a rotor) 83 disposed with an air gap generated from the stator. The nut 83 is supported on the housing 82 via a bearing 84. A ball screw mechanism 85 converts a nut rotational force of the coaxial motor 81 into an axial thrust force, and transmits it to a shaft (the biasing target member) 86. A coil spring 88 is set in a compressed state between an inner wall 82a of the housing 82 and the shaft 86 in the housing 82 (the containing portion). The coil spring 88 is a conical spring, and biases the shaft 86 rearward (rightward in FIG. 11). In the electric brake 80, when the coaxial motor 81 is rotationally driven, a rod 87 provided integrally with the shaft 86 is moved forward (leftward in FIG. 11) to thus press brake pads of a brake caliper against a disk rotor, by which a braking force is applied to a wheel. When the driving of the coaxial motor 81 is stopped, the rod 87 is moved rearward due to the biasing force of the coil spring 88, by which a predetermined clearance is secured between the brake pads and the disk rotor.

The coil spring 88 according to the third embodiment is designed so as to satisfy the conditions expressed by the equation 1 and the equation 3 described in the first embodiment. Due to this design, the number of effective turns N1 of the coil spring 88 in the set state can more closely approach an integer than the number of effective turns N0 in the natural length state before the coil spring 88 is set, and have a value around an integer. Therefore, the present configuration can reduce the lateral force of the coil spring 88 to a weak force, thereby preventing or reducing a tilt of the nut 83 and thus improving operability of the ball screw mechanism 85.

Fourth Embodiment

A fourth embodiment is different from the first embodiment in terms of designing the control valve spring 30 so as to satisfy the conditions expressed by the equation 1 and the equation 3 described in the first embodiment. Due to this design, the number of effective turns N1 of the control valve spring 30 in the set state can more closely approach an integer than the number of effective turns N0 in the natural length state before the control valve spring 30 is set, and have a value around an integer. Therefore, the lateral force of the control valve spring 30 can be reduced. The spool (the biasing target member) 29 requires a radial clearance for being moved in the valve hole (the containing portion) 28 formed in the front body (the housing member) 2, and may be tilted by a large amount if the lateral force of the control valve spring 30 is great. Therefore, the present configuration can acquire a stable operation of the spool 29 by reducing the lateral force of the control valve spring 30.

In the following description, technical ideas recognizable from the above-described embodiments will be described.

A vehicle-mounted apparatus having a biasing structure using a coil spring, in one configuration thereof, includes a housing member including a containing portion therein, a biasing target member movably provided in the containing portion, and the coil spring provided in the containing portion. The coil spring is configured to bias the biasing target member. The coil spring is set in the containing portion in a compressed state. When N1 and n1 represent the number of effective turns and a value of an integer of the number of effective turns of the coil spring in the compressed state, respectively, and N0 and n0 represent the number of effective turns and a value of an integer of the number of effective turns of the coil spring when a length of the coil spring is a natural length, respectively, the coil spring satisfies an equation 1: $0 \leq N1-n1 \leq 0.25$ or an equation 2: $0.75 \leq N1-n1 < 1$. When the number of effective turns N1 of the coil spring in the compressed state satisfies the equation 1, the coil spring satisfies an equation 3: $N1-n1 < N0-n0$. When the number of effective turns N1 of the coil spring in the compressed state satisfies the equation 2, the coil spring satisfies an equation 4: $N0-n0 < N1-n1$.

According to a further preferable configuration, in the above-described configuration, the coil spring has a non-linear deformation characteristic.

According to another preferable configuration, in any of the above-described configurations, the coil spring has a barrel-like shape.

According to further another preferable configuration, in any of the above-described configurations, the housing member includes a hydraulic fluid passage in which hydraulic fluid flows, and a restriction portion configured to restrict a movement of the biasing target member on one side in a movement direction of the biasing target member. The coil spring is provided on the other side in the movement direction of the biasing target member. The biasing target member is a valve body, and the biasing target member is biased toward the restriction portion side by the coil spring and switches a communication state of the hydraulic fluid passage by being moved from a first state in abutment with the restriction portion to a second state spaced apart from the restriction portion against the biasing force of the coil spring.

According to further another preferable configuration, in any of the above-described configurations, the restriction portion is a valve seat which the biasing target member is in abutment with. The biasing target member is a one-way valve that blocks and establishes communication through the hydraulic fluid passage in the first state and in the second state, respectively.

According to further another preferable configuration, in any of the above-described configurations, when a central axis is defined to be an imaginary line passing through a center of the containing portion in a cross section of the containing portion perpendicular to an axis extending in the movement direction of the biasing target member. The imaginary line extends in parallel with the axis. The valve seat serving as the restriction portion includes a through-hole that is an axial hole provided in the restriction portion so as to extend through in a direction of the axis. The through-hole is provided in such a manner that a formed position in a cross section of the restriction portion perpendicular to the direction of the axis is positioned approximately at the center of the cross section of the containing portion. The valve seat further includes a valve seat portion provided on the other side of the valve seat in the movement direction. The valve seat portion is annularly formed so as to surround the through-hole. The valve seat portion is disposed in such a manner that a center thereof in a cross section perpendicular to the direction of the axis is offset from the central axis. The valve body serving as the biasing target member has a spherical shape that opens and closes the through-hole.

According to further another preferable configuration, in any of the above-described configurations, when F1, F2, and F3 represent a component in a radial direction with respect to the central axis that is included in a pressure of the hydraulic fluid in the through-hole that the valve body receives in an inner region with respect to the annular valve seat portion with the valve body in abutment with the valve seat portion, a force in the radial direction with respect to the central axis that reduces the component F1 due to a tilt of the valve body with respect to the central axis, and a force of the biasing force of the coil spring in the radial direction with respect to the central axis that reduces the component F1, respectively, the valve seat portion is formed so as to satisfy an equation 5: F1>F2+F3.

According to further another preferable configuration, in any of the above-described configurations, the hydraulic fluid passage includes a first hydraulic fluid passage and a second hydraulic fluid passage. The biasing target member is a spool valve body that switches a communication state in such a manner that the first hydraulic fluid passage is brought into the communication state in the first state and the second hydraulic fluid passage is brought into the communication state in the second state.

According to further another preferable configuration, in any of the above-described configurations, the coil spring satisfies the equation 1.

According to further another preferable configuration, in any of the above-described configurations, the coil spring is formed in such a manner that a winding pitch thereof is shorter at both end portions than at a central portion in the movement direction of the biasing target member.

According to further another preferable configuration, in any of the above-described configurations, the biasing target member is a nut of a ball screw.

According to further another preferable configuration, in any of the above-described configurations, the biasing target member is a rack retainer that biases a rack of a rack and a pinion.

The present invention is not limited to the above-described embodiments, and includes various modifications.

For example, the above-described embodiments have been described in detail to facilitate better understanding of the present invention, and the present invention is not necessarily limited to the configuration including all of the described features. Further, a part of the configuration of some embodiment can be replaced with the configuration of another embodiment, and some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2016-213973 filed on Nov. 1, 2016. The entire disclosure of Japanese Patent Application No. 2016-213973 filed on Nov. 1, 2016 including the specification, the claims, the drawings, and the abstract is incorporated herein by reference in its entirety.

REFERENCE SIGN LIST 1 variable displacement vane pump (vehicle-mounted apparatus)
2 front body (housing member)
29 spool (housing member)
30 control valve spring (coil spring)
34 valve hole (containing portion)
35 ball (biasing target member)
37 relief valve spring (coil spring)
60 rack and pinion steering apparatus (vehicle-mounted apparatus)
64 housing (housing member)
66 rack retainer containing portion (containing portion)
67 rack retainer (biasing target member)
69 coil spring
80 electric brake (vehicle-mounted apparatus)
82 housing (housing member)
86 shaft (biasing target member)
88 coil spring

The invention claimed is:

1. A vehicle-mounted apparatus having a biasing structure using a coil spring, the vehicle-mounted apparatus comprising:
a housing member including a containing portion therein;
a biasing target member movably provided in the containing portion; and
a coil spring provided in the containing portion and configured to bias the biasing target member, the coil spring being set in the containing portion in a compressed state,
wherein, when N1 and n1 represent the number of effective turns and a value of an integer of the number of effective turns of the coil spring in the compressed state, respectively, and N0 and n0 represent the number of effective turns and a value of an integer of the number of effective turns of the coil spring when a length of the coil spring is a natural length, respectively, the coil spring satisfies $$0 \leq N1-n1 \leq 0.25 \text{ or} \quad \text{an equation 1:}$$

$$0.75 \leq N1-n1 < 1, \quad \text{an equation 2:}$$

wherein, when the number of effective turns N1 of the coil spring in the compressed state satisfies the equation 1, the coil spring satisfies $$N1-n1 < N0-n0, \text{ and} \quad \text{an equation 3:}$$

wherein, when the number of effective turns N1 of the coil spring in the compressed state satisfies the equation 2, the coil spring satisfies $$N0-n0 < N1-n1. \quad \text{an equation 4:}$$

2. The vehicle-mounted apparatus having the biasing structure using the coil spring according to claim 1, wherein the coil spring has a non-linear deformation characteristic.

3. The vehicle-mounted apparatus having the biasing structure using the coil spring according to claim 2, wherein the coil spring has a barrel-like shape.

4. The vehicle-mounted apparatus having the biasing structure using the coil spring according to claim 1, wherein the housing member includes a hydraulic fluid passage in which hydraulic fluid flows, and a restriction portion configured to restrict a movement of the biasing target member on one side in a movement direction of the biasing target member, wherein the coil spring is provided on the other side in the movement direction of the biasing target member, and wherein the biasing target member is a valve body, and the biasing target member is biased toward the restriction portion side by the coil spring and switches a communication state of the hydraulic fluid passage by being moved from a first state in abutment with the restriction portion to a second state spaced apart from the restriction portion against the biasing force of the coil spring.

5. The vehicle-mounted apparatus having the biasing structure using the coil spring according to claim 4, wherein the restriction portion is a valve seat which the biasing target member is in abutment with, and wherein the biasing target member is a one-way valve that blocks and establishes communication through the hydraulic fluid passage in the first state and in the second state, respectively.

6. The vehicle-mounted apparatus having the biasing structure using the coil spring according to claim 5, wherein, when a central axis is defined to be an imaginary line passing through a center of the containing portion in a cross section of the containing portion perpendicular to an axis extending in the movement direction of the biasing target member, the imaginary line extending in parallel with the axis, the valve seat serving as the restriction portion includes a through-hole that is an axial hole provided in the restriction portion so as to extend through in a direction of the axis, the through-hole being provided in such a manner that a formed position thereof in a cross section of the restriction portion perpendicular to the direction of the axis is positioned approximately at the center of the cross section of the containing portion, and a valve seat portion provided on the other side of the valve seat in the movement direction, the valve seat portion being annularly formed so as to surround the through-hole, the valve seat portion being disposed in such a manner that a center thereof in a cross section perpendicular to the direction of the axis is offset from the central axis, and wherein the valve body serving as the biasing target member has a spherical shape that opens and closes the through-hole.

7. The vehicle-mounted apparatus having the biasing structure using the coil spring according to claim 6, wherein, when F1, F2, and F3 represent a component in a radial direction with respect to the central axis that is included in a pressure of the hydraulic fluid in the through-hole that the valve body receives in an inner region with respect to the annular valve seat portion with the valve body in abutment with the valve seat portion, a force in the radial direction with respect to the central axis that reduces the component F1 due to a tilt of the valve body with respect to the central axis, and a force of the biasing force of the coil spring in the radial direction with respect to the central axis that reduces the component F1, respectively, the valve seat portion is formed so as to satisfy $$F1 > F2+F3. \quad \text{an equation 5:}$$

8. The vehicle-mounted apparatus having the biasing structure using the coil spring according to claim 4, wherein the hydraulic fluid passage includes a first hydraulic fluid passage and a second hydraulic fluid passage, and wherein the biasing target member is a spool valve body that switches a communication state in such a manner that the first hydraulic fluid passage is brought into the communication state in the first state and the second hydraulic fluid passage is brought into the communication state in the second state.

9. The vehicle-mounted apparatus having the biasing structure using the coil spring according to claim 1, wherein the coil spring satisfies the equation 1.

10. The vehicle-mounted apparatus having the biasing structure using the coil spring according to claim 1, wherein the coil spring is formed in such a manner that a winding pitch thereof is shorter at both end portions than at a central portion in the movement direction of the biasing target member.

11. The vehicle-mounted apparatus having the biasing structure using the coil spring according to claim 1, wherein the biasing target member is a nut of a ball screw.

12. The vehicle-mounted apparatus having the biasing structure using the coil spring according to claim 1, wherein the biasing target member is a rack retainer that biases a rack of a rack and a pinion.

* * * * *